July 27, 1937.  A. E. BACHELET  2,088,317
ELECTRIC DISCHARGE TUBE TESTING AND MEASURING CIRCUIT
Filed Aug. 21, 1934  5 Sheets-Sheet 1
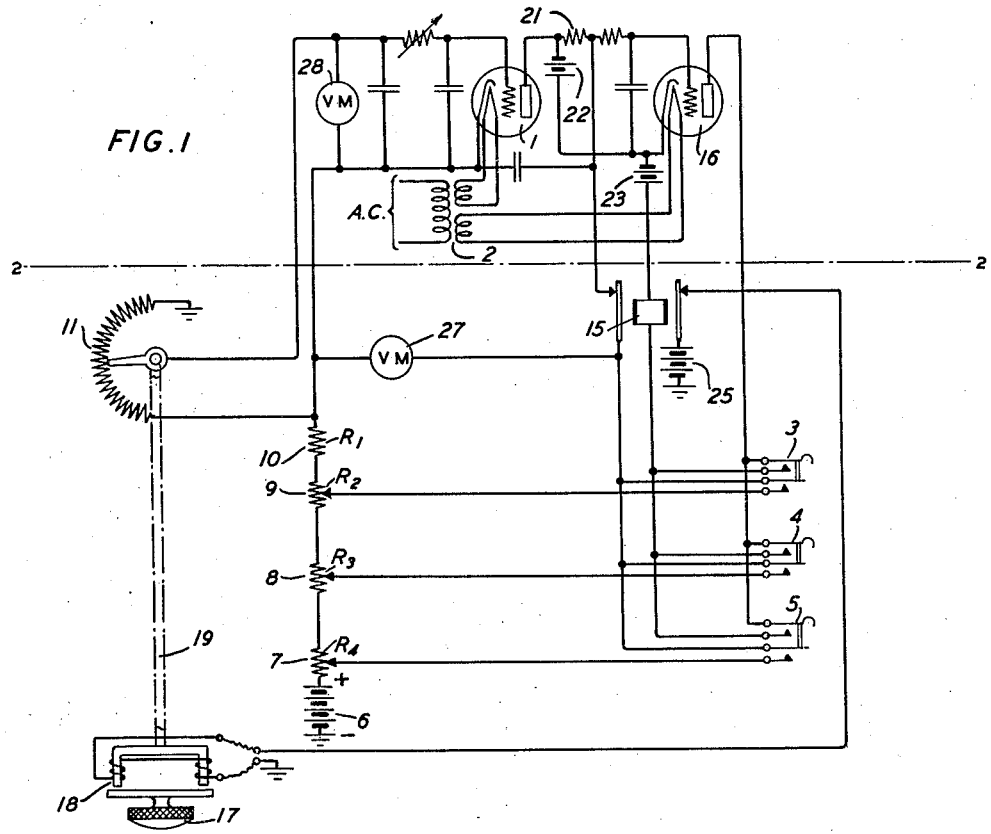
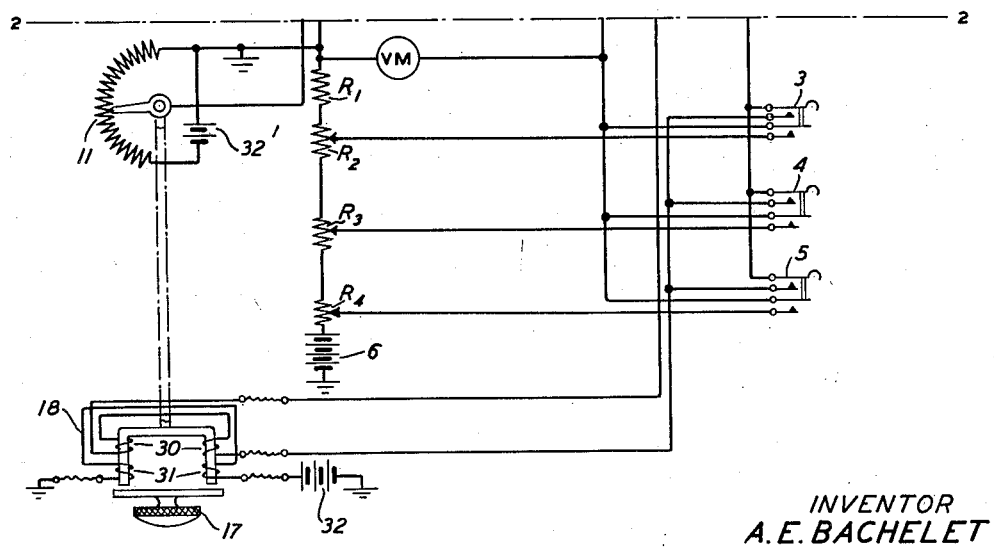
INVENTOR
A. E. BACHELET
BY
ATTORNEY July 27, 1937.　　　A. E. BACHELET　　　2,088,317
ELECTRIC DISCHARGE TUBE TESTING AND MEASURING CIRCUIT
Filed Aug. 21, 1934　　　5 Sheets-Sheet 3

INVENTOR
A. E. BACHELET
BY
ATTORNEY

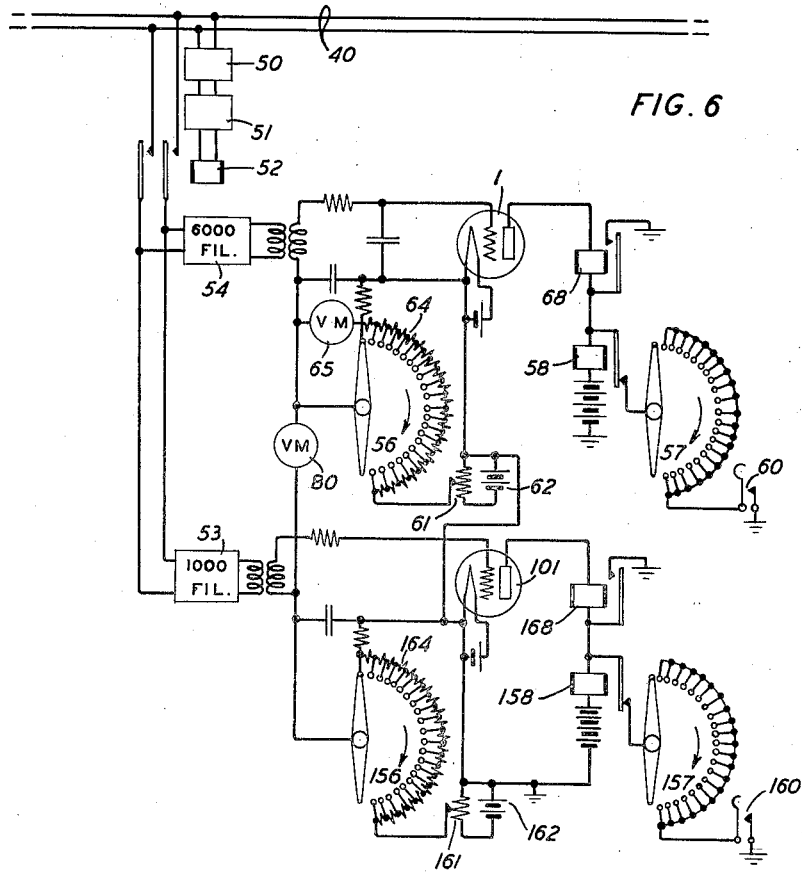
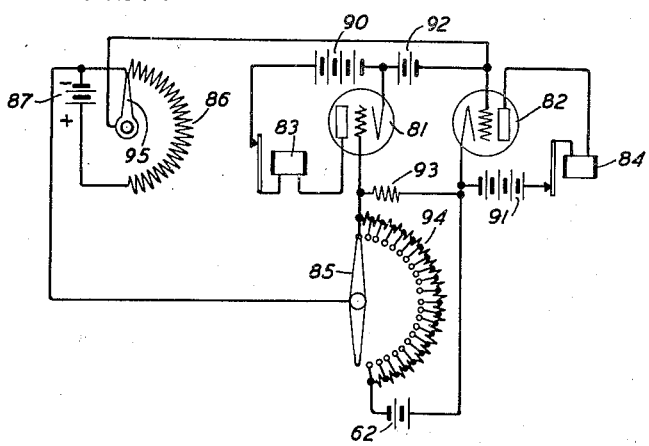

Patented July 27, 1937

2,088,317

UNITED STATES PATENT OFFICE 2,088,317

ELECTRIC DISCHARGE TUBE TESTING AND MEASURING CIRCUIT

Albert E. Bachelet, Mount Vernon, N. Y., assignor to Bell Telephone Laboratories, Incorporated, New York, N. Y., a corporation of New York Application August 21, 1934, Serial No. 740,745

9 Claims. (Cl. 250—27)

The present invention relates to space discharge tube circuits and especially to circuits using gas-filled tubes, that is, tubes capable of maintaining discharge current by gas ionization independent of grid control after the discharge has been initiated.

An object of the invention is a circuit in which the discharge control conditions of a tube are indicated or determined in part with the aid of or by the operation of the tube itself.

Another object is a circuit in which a current-actuated device in the output circuit of a tube automatically controls an input setting for determining the magnitude of an impressed voltage.

A further object is a circuit employing a gas-filled tube and acting as a stepping circuit for causing a member to follow the movement of a control member or changes in impressed voltage.

In a specific embodiment of the invention to be described, a gas-filled tube has a current-operated device, such as a relay, in its output which, upon actuation, interrupts the discharge current circuit and determines the magnitude of the applied potential. In one form, such relay steps around a switch which controls the negative bias applied to the grid or control circuit of the tube. For example, the negative bias voltage is increased in steps until eventually the applied impulse is unable to overcome the negative bias and cause the tube to discharge. The point at which the switch is stopped may be used to indicate directly or indirectly the magnitude of the applied control voltage. By varying the magnitude of an externally applied voltage, the switch referred to may be stepped to a new position and by employing a pair of tubes suitably associated, the switch may be made to follow the applied voltage variations for both increasing and decreasing voltages.

Various applications and adaptations may be made, some of which will be specifically disclosed.

The various objects and features of the invention will appear more fully from the following detailed description of specific embodiments of the inventive idea, taken in connection with the attached drawings, in which:

Figs. 1, 2 and 3 are schematic circuit diagrams of circuits for rapidly determining the operating characteristics of a gas tube;

Figs. 5 and 6 show modifications of the system of Fig. 4;

Fig. 7 shows a circuit for causing a member to follow increasing and decreasing voltage.

Figure 3:
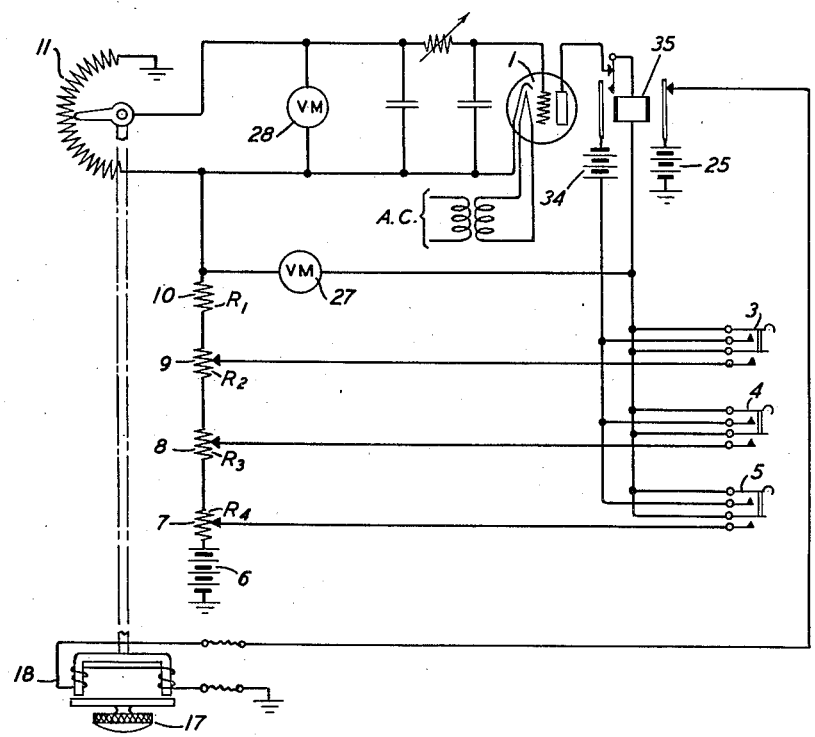

Referring first to Fig. 1, there is shown a circuit for quickly and accurately determining the operating characteristics of a gas-filled tube 1. This tube may be any type of gas tube having a suitable cathode, anode and control element in an atmosphere capable of maintaining discharge current flow after the discharge has once been initiated. The discharge is operated by the application of suitable voltage to the control electrode, there being also at the same time a positive voltage applied to the anode. There are many designs of tubes of this general type in the art. One such tube is disclosed and claimed in United States Patent 1,921,004 to A. L. Samuel, patented August 8, 1933.

It is found that tubes of this general type have varying operating characteristics dependent upon their recent history, as, for example, upon the magnitudes and duration of current and voltages that have been applied to the tubes. In using tubes of this type in circuits where accuracy is important in the response of the tube or where the tube is to operate within close limits, it is important either to know in advance the operating characteristics of a particular tube or to provide for calibration of the tube at suitably frequent intervals.

In the circuit of Fig. 1, the tube 1 under test has its heater supplied with current from an alternating current source through the transformer 2 and is arranged to have any one of the number of plate voltages applied depending upon which one of a number of keys 3, 4 or 5 is operated. For this purpose, a battery 6 having its negative pole grounded is connected through a series of resistances 7, 8, 9 and 10 and a potentiometer resistance 11 to ground while the keys 3, 4 and 5 are each arranged by their lower set of springs to connect a point on certain of these respective resistances to the anode of the tube 1 by way of the left-hand back contact of relay 15. The cathode of the tube 1 is connected to a point between the resistances 10 and 11.

The potentiometer 11 is adjusted by hand by turning the knurled head 17 when the magnetic clutch 18 is energized, attracting the disc to which the knurled head 17 is secured, the shaft for the clutch leading to the slider on the potentiometer being indicated at 19. A second tube 16 which may be entirely similar to the tube 1 under test or any other suitable type, is arranged to control relay 15 and through it the magnetic clutch 18.

The operation of the circuit will now be described. With the relay 15 in its deenergized condition, the magnetic clutch 18 is engaged by virtue of current from battery 25 through the clutch winding, and by turning the knurled head 17 the potentiometer 11 may be adjusted to apply a comparatively large negative bias to the grid of the tube 1. Let it be supposed that the tube 1 is to be tested for the least negative applied grid voltage which will initiate discharge in the tube for an applied plate voltage of about 130 volts. To do this, the key 5 is depressed thus applying a positive voltage from a point on the resistance 7 through the lower spring of the key 5 and back contact of relay 15 to the plate of the tube 1, the cathode being connected as above stated to a point between resistances 10 and 11. The knurled head 17 is then turned in a direction to reduce the negative bias applied to the grid 1, it being assumed that the negative bias was sufficient initially to prevent discharge through the tube. As the negative voltage is thus decreased on the grid, a point is reached where tube 1 breaks down and the resulting current flow through resistance 21 applies such a voltage to the grid of the tube 16 as to cause it to break down also. It should be mentioned that the tube 16 is given constant operating characteristics by having applied to it a constant plate voltage from battery 23 (when key 3, 4 or 5 is closed) and a suitable and constant negative grid bias voltage from battery 22.

When the tube 16 breaks down, relay 15 is energized by current flow from battery 23 through the winding of the relay, upper springs of key 5 to the anode of tube 16. Relay 15 by breaking its right-hand back contact disengages the clutch 18 by interrupting current flow from battery 25 through the winding of the clutch magnet. The disengagement of the clutch 18 causes the slider on potentiometer 11 to stop even though the knurled head 17 continues to be turned. Relay 15 at its left contact breaks the anode circuit of the tube 1 causing the discharge current through the tube to stop.

Under these conditions, the attendant reads directly from the voltmeter 27 the anode voltage that was applied to the tube 1 and from voltmeter 28 the grid voltage which caused the tube 1 to break down. The readings of these two meters remain fixed for any desired length of time after a test has been made so that it is not necessary for the attendant to observe limits of swing of a meter or peak indications. It will be observed that the type of test that has been described can be made very quickly and readily even by an unskilled attendant. The proper key, such as 5, is depressed and the knurled member 17 is given a spin. The moving member of the potentiometer 11 is automatically stopped corresponding to the instantaneous grid voltage which caused the discharge and the meters 27 and 28 as already stated, remain fixed at the points corresponding to the discharge conditions. When key 5 is released, the relay 15 and tube 16 are restored to normal condition.

To test the tube at a plate voltage of the order of 90 volts, for example, the knurled head 17 is turned (if necessary) to insure a sufficiently large negative grid bias, the key 4 is in this case depressed and the handle 17 is again turned in the proper direction until the tube discharges. Other keys, such as 3, may be provided for testing the tube 1 at successively lower plate potentials.

The nature of the modification shown in Fig. 2 can be readily understood by considering that Fig. 2 replaces that part of Fig. 1 below the broken line 2—2. The difference between these two figures consists in the omission in Fig. 2 of relay 15 and in a modification of the clutch 18. The clutch magnet has one pair of windings 31 energized from battery 32 and a second pair of windings 30 which oppose the action of windings 31 when current flows through windings 30 from the plate circuit of the tube 16. The procedure in the operation of Fig. 2 is the same as that described above for Fig. 1. There being normally no current flow through tube 16, clutch 18 is engaged so that movement of the knurled handle 17 moves the slider on the potentiometer resistance 11. As soon as the tube 1 under test discharges, tube 16 also breaks down, sending current flow from battery 23 through the windings 30 on the clutch magnet 18, upper springs of the key 3, 4, or 5 that was depressed to make the test, anode and space current path of the tube 16. Current flow in this circuit opposes the magnetic effect of current through windings 31 from battery 32 and causes the clutch 18 to release so that further turning of the handle 17 has no effect on the adjustment of the resistance 11.

A further distinction of Fig. 2 over Fig. 1 is that in Fig. 2 the resistance 11 does not receive current from battery 6 but is provided with an individual battery 32'. The reason for this is seen by comparison of the conditions before and after breakdown in Figs. 1 and 2. In Fig. 1 before the tube 1 breaks down there is no finite resistance in shunt of the potentiometer comprising resistances 7 to 11, inclusive. If it were not for the fact that the left armature of relay 15 breaks the plate circuit of the tube 1, there would be a finite resistance shunting the resistances 7, 8, 9, 10 or the portion of them included in circuit by whichever key 3, 4 or 5 is depressed, this shunt resistance comprising resistance 21 and the internal resistance of the tube 1. Since the relay 15 is omitted in Fig. 2, the shunt path just traced exists in Fig. 2 after the tube 1 breaks down. This would make the reading of the grid voltmeter 28 erroneous in Fig. 2 if the resistance 11 received all of the current flowing from battery 6 both through the resistances 7, 8, 9 and 10 and through the shunt circuit through resistance 21 and tube 1. This error is avoided by use of a separate battery 32 for the resistance 11.

Fig. 3 is similar to Fig. 1 but does not have the second tube 16. In Fig. 3, the procedure in testing tube 1 is the same as outlined in connection with Fig. 1. When the tube 1 breaks down, space current through the tube flows through windings of relay 35, whichever one of the keys 3, 4 or 5 has been depressed and the corresponding portion of resistances 7, 8 or 9 to ground. When relay 35 energizes, it cuts off current from battery 25 through the right-hand back contact of relay 35 to the winding of clutch 18 causing the clutch to release, and at the left-hand front contact of relay 35 the space current circuit for the tube 1 is broken and a locking circuit closed from battery 34 through the winding of relay 35 and the upper springs of the depressed key 3, 4 or 5. The meters 27 and 28 may then be read. When the depressed key is released, relay 35 is released.

Figure 4:
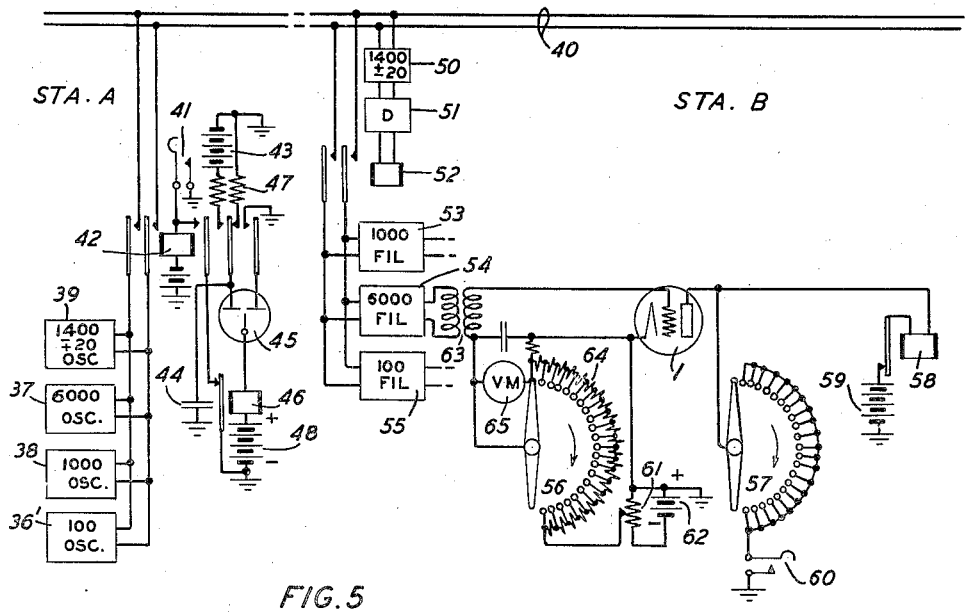
Fig. 4 shows the circuit of a system for using gas tubes to determine transmission levels on a circuit.

Referring to Fig. 4, a toll program line 40 is shown extending between station A at the left and station B at the right. The line 40 may be a program circuit leading from a studio associated with station A to a broadcasting equipment located at station B. It is desirable to test the transmission characteristics of the line 40 from time to time and the apparatus of Fig. 4 shows a means of doing this in a very short interval of time, for example, in the short interval when the line 40 is dissociated from the broadcasting equipment for station announcement purposes.

In accordance with the circuit of Fig. 4, the line 40 is tested by sending a number of different frequencies, for example, 100 cycles, 1000 cycles and 6000 cycles over the line and measuring the equivalent of the line 40 at each one of these separate frequencies. It is usual practice to provide attenuation equalizers or other regulating equipment for the line 40 so that all frequencies in the utilized band are transmitted over the line 40 either equally or in some desired proportion. When the test frequencies are sent over the line in accordance with Fig. 4, the manner in which they are received gives an indication to the attendant from which he may judge whether or not the regulating equipment associated with line 40 needs to be readjusted.

The nature of the circuit will be clear from describing the manner of its operation. When the attendant at station A presses key 41, relay 42 is energized and attracts the two armatures on the left and the three armatures on the right. Four sources of current 36, 37, 38 and 39 are thus connected to the line 40 to send over it, respectively, 100 cycle current, 1000 cycle current, 6000 cycle current and a 1400 cycle current modulated by 20 cycles. The inner right-hand armature of relay 42 closes a locking circuit for the relay from battery, winding of relay 42, its own inner armature and front contact and the armature and back contact of relay 46. The middle right-hand contact of relay 42 connects positive battery 43 through suitable resistance to the control electrode of the cold cathode gas discharge tube 45, condenser 44 being permanently connected between this electrode and ground. As a result, condenser 44 begins to charge up at a rate determined by the size of the capacity and the resistance included in the series circuit. At the same time, the cathode of tube 45 is grounded by the outer right-hand armature and contact of relay 42. Anode potential is applied to the anode of relay 45 from battery 48 through the winding of relay 46. After a sufficient charge accumulates on condenser 44, the potential of the control electrode is raised to the point where the tube 45 discharges between its grounded cathode and its anode which is, as stated, connected to battery 48 through windings of relay 46. When this discharge takes place, relay 46 energizes and breaks the holding circuit of relay 42 which now releases and restores the entire circuit to normal, condenser 44 now discharging through resistance 47 and back contact of middle right-hand armature of relay 42. It will thus be seen that the tube 45 and its associated circuit provide a timing device for permitting the current from the oscillators 36 to 39 to be connected to the line 40 for a brief interval and then to be removed from the line.

The effect of these currents at the station B will now be described. A tuned amplifier 50 selects the 1400 cycle current modulated by 20 cycles and this is detected at 51 and operates relay 52 connecting the three filters 53, 54 and 55 across the line 40 for the duration of the receipt of the current from station A. Each filter 53, 54 and 55 leads to a separate measuring circuit, only one of which is shown, that connected to the output of the 6000 cycle filter 54, it being understood that the measuring circuits connected to the other filters may be entirely similar to that shown.

The measuring circuit comprises a gas tube 1 which may be of the same type as the tube 1 described in the previous figures. This tube controls a stepping switch having stepping magnet 58 and sectors 56 and 57. Previous to the testing interval, the tube 1 has been calibrated, that is, it has been adjusted by movement of the slider on resistance 61 to the point where only a minute amount of positive voltage need be applied to the control electrode through the input transformer 63 to cause the tube 1 to break down.

When the wave is received through filter 54, as described, and is impressed through transformer 63 on the control circuit of the tube 1, the tube breaks down due to its adjustment to its sensitive condition as described, and the stepping magnet 58 is energized, causing the switch to take one step. It will be noted that all of the contacts of switch sector 56 are connected along a resistance 64 which is connected in series with a portion of resistance 61 determined by the setting of the slider. When the switch takes a step, therefore, it results in applying to the control electrode of the tube 1 a slightly greater negative bias. If the wave applied through transformer 63 is of sufficient peak amplitude when the stepping magnet 58 deenergizes and reapplies plate battery 59 to the anode of the tube 1, this tube will again break down, causing the switch to take another step. This process continues until the negative bias applied to the control circuit of tube 1 by switch 56 is just equal to or slightly greater than the peak voltage of the wave applied through the transformer 63. When this point has been reached, the switch stops stepping since tube 1 is no longer discharged. The grid voltage corresponding to the point at which the switch remains stopped is shown on voltmeter 65 which gives an indication to the attendant of the amplitude of the received wave.

The foregoing action at station B takes place in a very brief interval of time, for example, in one second or at most in a very few seconds. Thus, after the test has been completed, the attendant looks at the settings of the three voltmeters, such as 65, connected to the switches associated with the filters 53, 54 and 55 and by comparison of their readings he is enabled to judge whether any readjustment of the transmission apparatus associated with the line 40 is required. After the attendant has noted the readings of the different switches, he restores each switch to normal by pressing the corresponding key 60 which provides a ground for stepping magnet 58 until the switch reaches normal position.

Figure 5:
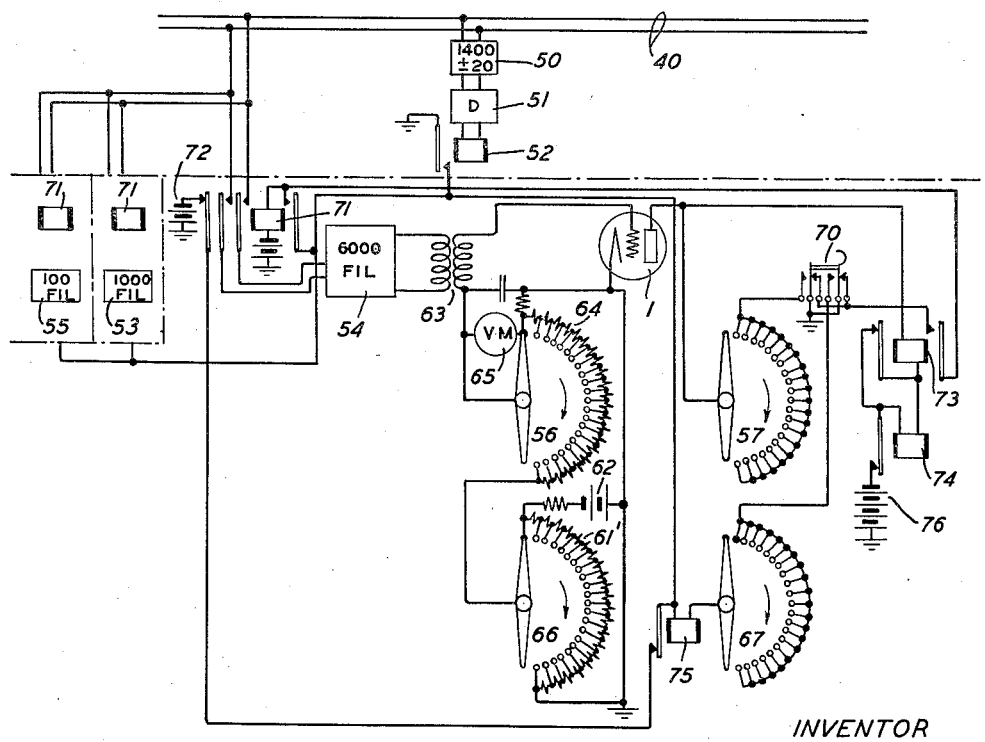

In Fig. 5 a circuit is shown which is similar to the receiving station of Fig. 4, but is arranged to be self-calibrating. For this purpose, an extra step-by-step switch 66, 67 with its stepping magnet 75 is provided to perform the function that is performed by the sliding resistance 61 of Fig. 4. The nature of this circuit will be made clear from a description of its operation. When the series of waves from the distant sending station are received over the line 40, the 1400 cycle wave modulated at 20 cycles is selected by amplifier 50, detected at 51 and operates relay 52. The other waves at this time have no effect because their circuits for receiving them remain disconnected as long as no relay 71 is energized.

Attention will first be confined to the test circuit associated with filter 54. Relay 52, in energizing, closes a circuit from ground through the windings of stepping magnet 75 and battery 72 causing stepping magnet 75 to step around the arms of switch 66, 67 thus reducing the negative bias voltage on the control circuit of the tube 1. This action continues until the negative voltage on the grid of tube 1 is so far reduced as to permit that tube to discharge, at which time relay 73 in the plate circuit of the tube 1 is energized from battery 76. Relay 73 at its right-hand contact closes a circuit from grounded contact of key 70 for the winding of relay 71, causing that relay to energize and lock up over contact of relay 52. Relay 71, in energizing, breaks the stepping circuit for switch 66, 67 causing that switch to remain at the position to which it was stepped. Relay 71 also connects the filter 54 across the line 40.

When relay 73 energized, as described, it opened the short-circuit around the winding of stepping magnet 74 allowing this magnet to energize and move switch 56, 57 one step. When the switch arm of switch sector 56 takes this step, it makes the bias voltage on the control circuit of tube 1 more negative by just such an amount that the tube 1 will not break down when the only voltage applied to its control circuit is the voltage derived from the two switch sectors 56 and 66 and battery 62. In this condition the circuit is now calibrated.

From this point on, the operation of the circuit is the same as that described for Fig. 4, that is, waves received through the filter 54 are impressed through transformer 63 on the control circuit of the tube 1 and if their peak value is of sufficient amplitude to overcome the negative bias on the grid of the tube, the tube discharges operating relay 73. Each time relay 73 operates it removes the short-circuit around the winding of stepping magnet 74 allowing that magnet to operate and step the switch 56, 57. This process continues until the negative voltage applied to the grid in excess of the calibrating voltage equals the peak voltage of the wave applied to transformer 63. At this point the switch stops operating and the peak voltage of the applied wave can be read on the voltmeter 65. When the incoming waves cease, relay 52 deenergizes opening the first mentioned locking circuit for relay 71 allowing that relay to release. When the key 70 is depressed, ground is applied to the sectors 57 and 67, restoring both switches to normal.

An entirely similar operation takes place in the test circuits associated with filters 53 and 55. When relay 52 first became energized, it initiated the calibration cycle in all three test circuits, the lead to winding of stepping magnet 75 being multipled to the corresponding stepping magnets of the other test circuits. When the tube in each such circuit breaks down, the corresponding relay 71 is energized and the operation proceeds as described. In this way, the calibration cycle is gone through for each test circuit independently of the others.

In Fig. 6, a receiving test circuit for the line 40 is disclosed which automatically discriminates between the receiving level differences of two given frequencies and by a single meter reading enables the attendant to perceive what change in regulation of the circuit may be necessary. During a period of no transmission over the line 40 of testing current, the attendant calibrates the circuit by adjusting the potentiometers 61 and 161 so that the respective tubes 1 and 101, which may be similar to each other, are placed in the sensitive condition above referred to. A voltmeter 80 of the differential type is connected between the two switch arms of sectors 56 and 156 so that if there is any difference in the two calibrating voltages, this difference appears across the meter 80 and the attendant makes note of the reading of differential voltmeter 80 corresponding to the calibrated condition of the circuit. When the test waves are received over the circuit 40, the amplifier 50, detector 51 and relay 52 operate as in the previous figures to connect the receiving filters 53 and 54 across the line. The tubes 1 and 101 and their respective stepping relays 68 and 168 operate in response to the received waves to cause the stepping magnets 58 and 158, respectively, to step the switches around to the point where the negative bias potentials applied to the respective tubes are just large enough to prevent any further discharge of the tubes in the manner generally described in connection with previous figures. If the two switch arms of switch sectors 56 and 156 stop at such points as to apply the same potentials from their respective potentiometer resistances 64 and 164 to the control circuits of their respective tubes, the reading on the voltmeter 80 is the same as it was for the calibrated condition of the circuit and the attendant knows that the transmission levels for both the 6000 cycle current and the 1000 cycle current are the same. This means that no readjustment of the circuit is necessary. If the voltmeter reading at 80 is increased in one direction or the other, the attendant knows that he should alter a control in the variable attenuation network (not shown) in the line 40 in a corresponding direction and to a corresponding extent. After the test has been completed, keys 60 and 160 are pressed to restore the switches to normal.

In the circuit of Fig. 7, the switch 85 may be stepped around in either direction to follow the movement of the slider on the potentiometer resistance 86, under control of one or the other of the gas-filled tubes 81, 82 and their respective stepping magnets 83 and 84. For this purpose, a switch 85 is provided of a type well known in the art comprising two ratchets for driving the switch arms in one direction or the other, one ratchet and its corresponding pawl being associated with the stepping magnet 83 and the other ratchet and pawl being operated from the stepping magnet 84. With the circuit in the condition shown, the negative bias on the grid of tube 82 is the drop across the resistance 93 caused by current flow through this resistance from battery 62, there being no voltage at this time applied to the circuit from the battery 87. The negative bias on the grid of the tube 81 is the voltage of the battery 92. Separate plate batteries 90 and 91 are provided for the respective tubes.

Let it be supposed that the slider on resistance 86 is moved downward, that is, clockwise in the figure. This results in making the potential of the grid of tube 82 less negative and this tube operates, causing stepping magnet 84 to step the switch 85 in a clockwise direction and apply from the potentiometer resistance 94 a compensating voltage. For a given movement of the slider on potentiometer 86, the arm of switch 85 will be stepped until the amount of voltage applied from 86 is compensated by that applied from 94. The tube 82 then has its normal or original bias potential on the grid and no further movement of the switch 85 takes place. During this operation, the grid of tube 81 is no more positive than normally and does not function. Suppose, however, that the slider 95 is moved in a counter-clockwise direction from the position to which it has been moved, the grid of the tube 81 has its potential varied toward positive and this tube discharges, operating the stepping magnet 83 to step the switch 85 in a counter-clockwise direction. For a given movement of the switch arm 95, the switch arm 85 will be stepped until it takes up a position such that the increasingly negative potential applied to the grid of tube 81 from switch arm 85 counter-balances the potential applied from the resistance 86 and makes the grid potential for the tube 81 sufficiently negative to prevent further operation of the tube. In this manner, the switch arm 85 is made to follow movements of the slider 95 in both clockwise and counterclockwise directions.

Figure 8:
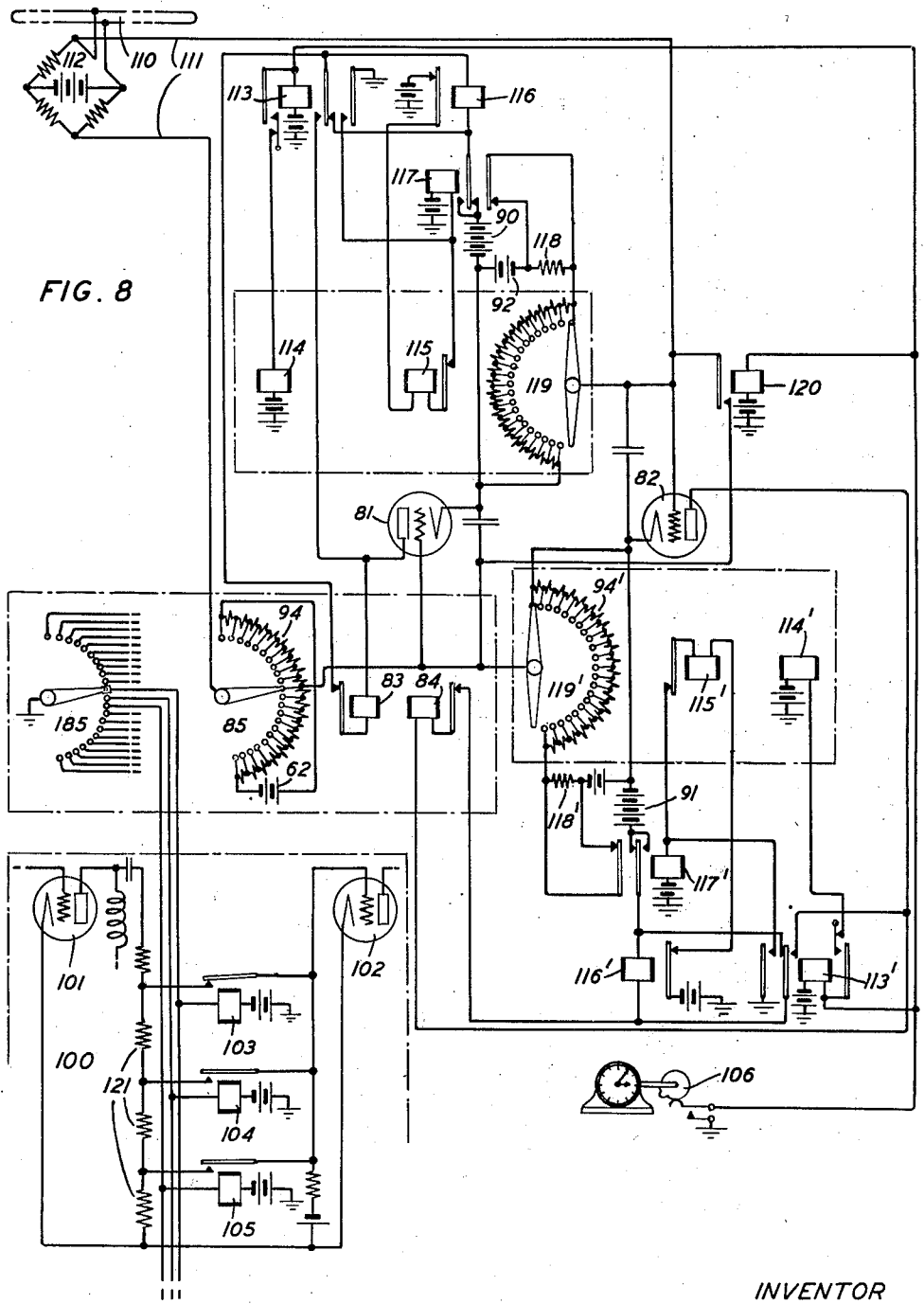
Fig. 8 shows application of the circuit of Fig. 7 for automatic gain control.

Referring to Fig. 8, the pilot wire 110 is included inside a lead sheathed cable (not shown) along with a number of transmission lines or is otherwise subjected to the same temperature variations as a group of transmission lines and is connected to control mechanism for varying the gain of repeaters associated with the transmission lines to compensate for attenuation changes in the lines due to variations in temperature. For illustrative purposes, one such repeater is shown at 100 and may comprise, in part, amplifier tubes 101 and 102 connected in tandem by a suitable coupling circuit comprising, in part, the resistance 121. The gain of this repeater is changed under control of a set of relays such as 103, 104, 105 arranged to include more or less of the coupling resistance 121 in the coupling circuit between the two tubes. These relays and other similar relays associated with other repeaters in the other lines are controlled from the pilot wire 110 through the medium of circuits that will now be described, the manner of controlling the repeater gain by the relays being as disclosed more fully in U. S. Patent to Ulrich 1,647,383, November 1, 1927.

The gain control circuit makes use of a pair of tubes 81 and 82 operating in the general manner described in connection with Fig. 7. Instead, however, of having a physically movable slider on resistance 86 as in Fig. 7, the voltage variation applied to the grids of the tubes 81 and 82 is in the form of the pilot conductor 110 and Wheatstone bridge 112 made up of three fixed resistance arms with the pilot conductor as the fourth arm. This bridge 112 is balanced at a mean temperature and becomes unbalanced in one direction or the other by temperature variations in opposite directions from the mean. When the bridge becomes unbalanced, a potential is applied across the diagonal 111 in one direction or the other and in varying amounts depending upon the unbalanced condition of the bridge. These varying potentials are applied to the tubes 81 and 82 in a manner analogous to the application of varying potentials in Fig. 7 by the movement of slider 95 over resistance 86.

Because of the tendency of gas-filled tubes such as 81 and 82 to vary in characteristic under conditions of use, automatic calibrating circuits are associated with each tube and will be described before a description is given of the manner in which the pilot wire 110 controls these tubes and their circuits.

The system is arranged so that the tubes 81 and 82 are automatically calibrated at predetermined intervals by a clock-controlled cam 106 which closes its switch springs at stated intervals, for example, once every hour. Considering first the calibrating circuit associated with tube 81, when the springs of cam 106 close, relay 113 is operated. This relay at its left armature closes a momentary circuit for the release magnet 114, causing the spring retracted brush of switch 119 to restore to its normal position as shown in the drawing. In this position, the brush of switch 119 connects to the most negative end of the potentiometer resistance. Since relay 120 is, at this time, also energized from cam 106, the grid of the tube 81 is directly connected to the brush of switch 119.

When relay 113 was energized, as described, it closed at its inner right-hand armature and front contact a direct shunt around the stepping magnet 83 for the switch sectors 85 and 185 so that the switch arms on these two sectors remain unchanged in their positions during the calibrating operation. At its outer right-hand contact and armature, relay 113 closed a stepping circuit for stepping magnet 115 through the back contact of relay 116 and also closes a circuit for relay 117 which opens a normal shunt around resistance 118 and changes the circuit of the B battery 90 from its back armature contact to its front armature contact for a purpose that will be described.

Stepping magnet 115 now operates to advance the brush of switch 119 to reduce the negative potential on the grid of the tube 81, it being assumed that when switch 119 was released it applied to the grid of tube 81 a negative voltage greater than that required to prevent operation of tube 81. The switch arm 119 advances under control of stepping magnet 115 until the negative bias on grid of tube 81 is reduced sufficiently to permit tube 81 to break down. When this occurs, space current flows through the tube and through an external circuit traceable from B battery 90, armature and front contact of relay 117, winding of relay 116, inner right armature and front contact of relay 113 to the anode of tube 81. When relay 116 is thus energized, it opens the circuit of the stepping magnet 115 causing the brush 119 to remain at rest at a point corresponding to the potential which just permitted the tube 81 to break down. The circuit remains in this condition until the clock-controlled cam 106 opens its spring releasing relays 113 and 120. Relay 113, on deenergizing at its outer right-hand armature and contact, releases relay 117, the inner armature of which in traveling between its front and back contacts, interrupts the anode circuit for tube 81 allowing that tube to restore to its un-ionized condition. At its outer contact, relay 117 places a shunt around the small resistance 118 and makes the bias potential for the grid of tube 81 slightly more negative. The tube 81 is now calibrated. At its inner right contact, relay 113 breaks the shunt circuit around stepping magnet 83 and closes a shunt around relay 116.

The tube 82 is calibrated in an entirely similar manner to that described above, the corresponding elements in its calibrating circuit bearing similar reference characters primed. The release of the relay 120 at the close of the calibrating period again places the circuit under control of the pilot wire 110 and bridge 112.

Let it be supposed that the resistance of the pilot wire 110 changes in such a direction as to make the grid of tube 82 more positive and that when this change occurs it requires that the gain of the repeater 100 be reduced. The grid of the tube 82 being thus made more positive, tube 82 breaks down and causes stepping magnet 84 to become energized in a circuit from the cathode of tube 82, plate battery 91, left contact of relay 117', left contact of relay 113' through winding of stepping magnet 84 and to anode of tube 82. Stepping magnet 84 moves switch arms of switch 85, 185 in a clockwise direction so that the brush arm of switch 85 takes up a more negative potential from battery 62. This increased negative potential is in a direction to oppose the assumed increase of positive potential on the grid of tube 82 from the bridge 112 as may be seen from tracing the grid circuit from the grid of tube 82, line 111, brush of switch 85, a portion of resistance 94 included between the brush and the central contact of the resistance 94, brush arm of calibrating switch 119' and thence to the cathode of tube 82. The stepping of the switch 185, 85 continues until the assumed positive change on the grid of tube 82 is just compensated for. Assuming that one step of the switch 85 is sufficient to do this, the brush arm of switch 185 moves off from the contact leading to relay 103 and moves on to the contact leading to relay 104, causing the former to release and the latter to be energized thus including a smaller portion of the resistance 121 in the coupling circuit between tubes 101 and 102 and reducing the gain of the repeater 100. A reverse change of potential between conductors 111 would tend to make the grid of the tube 81 more positive and this in an entirely analogous manner moving the switch 85, 185 in a counter-clockwise direction, controlling the relays such as 103, 104 and 105 to include more of the potentiometer resistance 121 in the coupling circuit of the repeater.

It will be understood that various modifications can be made without departing from the invention, the scope of which is indicated by the claims.

What is claimed is:

1. In combination, a space discharge device having an input or control circuit and an anode circuit, said device maintaining discharge current by gas ionization after the discharge is once initiated, a current-actuated device coupled to the anode circuit responsive to the flow of discharge current, a source of voltage for the input to cause initiation of discharge current, means to vary the voltage applied to said input from said source, and means controlled by said current-actuated device for controlling said means for varying the voltage applied to said input circuit from said source.

2. In combination, a space discharge device having an input or control circuit and an anode circuit, said device maintaining discharge current by gas ionization after the discharge is once started, the discharge being initiated when a voltage is applied to the input equal to the critical voltage, a source of voltage for the input, means to apply to the input from said source a varying voltage approaching the critical value, a current-actuated device coupled to the anode circuit responsive to the discharge current, and means controlled by said current-actuated device for stopping the variation of the voltage applied to the input when the total voltage so applied passes through the critical value.

3. In combination, a space discharge device having a grid- or impedance-controlling circuit and an anode circuit, a circuit for impressing an alternating current voltage on the grid circuit causing current to flow in the anode circuit, a current-actuated device coupled to the anode circuit responsive to the flow of space current, a source of unidirectional voltage in the grid circuit opposing the positive portions of said impressed voltage, and means controlled by said current-actuated means for determining the amount of voltage applied to the grid circuit from said source.

4. In combination, a space discharge device having a grid- or impedance-controlling circuit and an anode circuit, a circuit for impressing an alternating control voltage on said grid circuit, a source of negative bias voltage for the grid connected to oppose the positive peaks of the control voltage, a current-actuated device in the anode circuit, and means controlled by said current-actuated device for changing the negative grid bias voltage to a value substantially equal to the positive peaks of said control voltage.

5. In combination, a space discharge device having an anode circuit and a grid- or impedance-controlling circuit, said device maintaining discharge current by gas ionization after the discharge is once started, a current-actuated device in the anode circuit, means intermittently interrupting the discharge current, a source of control voltage for the grid circuit, a source of bias voltage for the grid opposing said control voltage, and means actuated by the successive actuations of said current-actuated device upon successive interruptions of the discharge current for changing the value of one of said voltages until both voltages are substantially equal in said grid circuit.

6. In combination, a space discharge tube maintaining discharge current flow by gas ionization when the discharge is once started, means for intermittently stopping the space discharge, an input circuit containing a source of control voltage for controlling starting of the discharge, a current-actuated device controlled by the discharge current, a source of voltage for biasing the tube against operation, and means controlled by said current-actuated device for changing the voltage of said bias source.

7. In combination, a space discharge tube having an input circuit and an output circuit, a source of control voltage and a source of bias voltage opposing each other in said input circuit, a current-actuated device in the output circuit, said tube having gas content enabling discharge current to pass by ionization when once started, means intermittently stopping the discharge current, means controlled by said current-actuated device for varying the bias voltage to such a value that no discharge takes place in the absence of other applied input voltage and means also controlled by said current-actuated device for varying the bias voltage when the control voltage is applied to a value such that no discharge takes place.

8. In a signaling system, a space discharge device having an input circuit and an anode circuit, said device maintaining discharge current by gas ionization when the discharge is once started, a circuit impressing a received voltage wave on said input, a stepping switch controlled by a stepping magnet operated from said anode circuit in response to discharge current flow, and means actuated by said switch for applying a voltage to said control circuit varying in magnitude to a limiting value equal to the peak voltage of the impressed wave.

9. A combination, according to claim 8, including a second switch and a stepping magnet therefor actuated from said anode circuit for applying to the control circuit, in the absence of other applied voltage, a bias voltage approximately equal to but slightly less than the control voltage necessary to initiate discharge.

ALBERT E. BACHELET.